(12) United States Patent
Keel et al.

(10) Patent No.: US 7,903,722 B2
(45) Date of Patent: Mar. 8, 2011

(54) HARDWARE-EFFICIENT SEARCHER ARCHITECTURE FOR CODE DIVISION MULTIPLE ACCESS (CDMA) CELLULAR RECEIVERS

(75) Inventors: Alton Shelborne Keel, Melbourne, FL (US); Louis Robert Litwin, Plainsboro, NJ (US); Zoran Kostic, Holmdel, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 722 days.

(21) Appl. No.: 11/792,885

(22) PCT Filed: Jan. 14, 2005

(86) PCT No.: PCT/US2005/000763
§ 371 (c)(1),
(2), (4) Date: Jun. 11, 2007

(87) PCT Pub. No.: WO2006/078232
PCT Pub. Date: Jul. 27, 2006

(65) Prior Publication Data
US 2008/0130546 A1    Jun. 5, 2008

(51) Int. Cl.
*H04B 1/00* (2006.01)
(52) U.S. Cl. .................................................. 375/148
(58) Field of Classification Search ............... 375/148
See application file for complete search history.

(56) References Cited

U.S. PATENT DOCUMENTS

| | | | |
|---|---|---|---|
| 5,060,239 A | 10/1991 | Briscoe et al. | |
| 5,483,292 A | 1/1996 | Ko | |
| 5,648,893 A | 7/1997 | Loo et al. | |
| 5,648,983 A * | 7/1997 | Kostic et al. | 375/150 |
| 5,764,687 A | 6/1998 | Easton | |
| 5,796,775 A | 8/1998 | Aoyama | |
| 5,995,512 A | 11/1999 | Pogue et al. | |
| 6,067,293 A | 5/2000 | Shoji | |
| 6,480,527 B1 | 7/2001 | Kim | |
| 6,366,606 B1 | 4/2002 | Sriram | |
| 6,700,925 B1 | 3/2004 | Ohnishi | |
| 6,771,693 B2 | 8/2004 | Lakkis | |
| 6,888,372 B1 | 5/2005 | Hazanchuk | |
| 7,130,331 B2 * | 10/2006 | Kang et al. | 375/149 |
| 7,248,635 B1 | 7/2007 | Arneson et al. | |
| 7,327,779 B1 * | 2/2008 | Lugil et al. | 375/141 |
| 7,532,663 B2 * | 5/2009 | Lewis | 375/150 |
| 2001/0004378 A1 * | 6/2001 | Takeuchi et al. | 375/148 |
| 2001/0036222 A1 | 11/2001 | Doetsch et al. | |
| 2002/0110103 A1 | 8/2002 | Jung | |

(Continued)

FOREIGN PATENT DOCUMENTS

CN    1189265    7/1998

(Continued)

OTHER PUBLICATIONS

International Search Report, dated Aug. 22, 2005.

(Continued)

*Primary Examiner* — Juan A Torres
(74) *Attorney, Agent, or Firm* — Robert D. Shedd; Joseph J. Opalach (57) ABSTRACT

An apparatus comprises a receiver for receiving a multipath signal and a searcher that stores delayed samples of the received multipath signal, wherein the searcher is operative on the delayed samples of the received multipath signal for identifying one or more paths of the received multipath signal.

12 Claims, 7 Drawing Sheets

U.S. PATENT DOCUMENTS

| | | |
|---|---|---|
| 2003/0103476 A1 | 6/2003 | Choi et al. |
| 2003/0103557 A1 | 6/2003 | Dolwin |
| 2003/0123528 A1 | 7/2003 | Hackett |
| 2003/0176171 A1 | 9/2003 | Sato et al. |
| 2003/0202541 A1 | 10/2003 | Lim et al. |
| 2003/0202565 A1 | 10/2003 | Li et al. |
| 2003/0235238 A1 | 12/2003 | Schelm et al. |
| 2004/0017846 A1 | 1/2004 | Fernandez-Corbaton et al. |
| 2004/0071199 A1* | 4/2004 | Boesel et al. ............... 375/150 |
| 2004/0085921 A1 | 5/2004 | Lin |
| 2004/0165566 A1 | 8/2004 | Lee et al. |
| 2004/0250049 A1 | 12/2004 | Becker et al. |
| 2005/0002369 A1 | 1/2005 | Ro et al. |
| 2005/0002442 A1 | 1/2005 | Litwin et al. |
| 2005/0207479 A1* | 9/2005 | Ruprich et al. ............... 375/150 |
| 2005/0208959 A1 | 9/2005 | Chen et al. |
| 2005/0225804 A1 | 10/2005 | Arquilevich et al. |
| 2006/0126491 A1 | 6/2006 | Ro et al. |
| 2006/0188005 A1 | 8/2006 | Espax |
| 2006/0199596 A1 | 9/2006 | Teauge et al. |
| 2008/0130720 A1 | 6/2008 | Dolwin |
| 2008/0225963 A1 | 9/2008 | Lakkis |
| 2009/0258605 A1 | 10/2009 | Boos |

FOREIGN PATENT DOCUMENTS

| | | |
|---|---|---|
| CN | 1280428 | 7/2001 |
| CN | 1365211 | 8/2002 |
| DE | 10241693 | 3/2004 |
| EP | 1109323 | 6/2001 |
| JP | 10173629 | 6/1998 |
| JP | 10240388 | 9/1998 |
| JP | 2000124847 | 4/2000 |
| JP | 2004164566 | 6/2004 |
| JP | 2006520149 | 8/2006 |

OTHER PUBLICATIONS

Elders-Boll, "WCDMA Baseband Design Faces Challenges", Wireless Systems Design, Jan./Feb. 2003.

Kiessling et al., "Performance Enhancements to the UMTS (W-CDMA) Initial Cell Search Algorithm", Agere Systems, IEEE, 2002.

* cited by examiner

HARDWARE-EFFICIENT SEARCHER ARCHITECTURE FOR CODE DIVISION MULTIPLE ACCESS (CDMA) CELLULAR RECEIVERS

This application claims the benefit, under 35 U.S.C. §365 of International Application PCT/US2005/00763, filed Jan. 14, 2005, which was published in accordance with PCT Article 21(2) on Jul. 27, 2006 in English. This application is related to copending, commonly assigned, U.S. patent applications Ser. Nos. 11/795,062 entitled SEARCHER HARDWARE TO PERFORM SCRAMBLING CODE DETERMINATION, filed on Jul. 10, 2007; 11/795,049 entitled EFFICIENT MAXIMAL RATIO COMBINER FOR CDMA SYSTEMS, filed on Jul. 10, 2007; 11/794,973 entitled RAM-BASED SCRAMBLING CODE GENERATOR FOR CDMA, filed on Jul. 9, 2007; and 11/795,063 entitled METHOD AND SYSTEM FOR SUB-CHIP RESOLUTION FOR SECONDARY CELL SEARCH, filed on Jul. 10, 2007.

BACKGROUND OF THE INVENTION

The present invention generally relates to a receiver architecture for use with Code Division Multiple Access (CDMA) and spread spectrum wireless networks.

Code Division Multiple Access (CDMA) refers to any of several protocols used in so-called second-generation (2G) and third-generation (3G) wireless communications. CDMA is a form of multiplexing that allows numerous signals (channels) to occupy a single physical transmission channel, thereby optimizing bandwidth. These signals are retransmitted using the same frequency band and are differentiated by transmitting each signal using a different spreading code. The spreading codes are orthogonal to each other. This property enables separate signals to be transmitted simultaneously from a transmitter (e.g., a base station) since a CDMA receiver can distinguish between these signals by correlating each received signal against a given spreading code. In a similar fashion, scrambling codes are used to distinguish between different base stations. In particular, each base station uses a different scrambling code for scrambling all of the transmitted signals. A scrambling code covers a radio frame (38,400 chips) and comprises 38,400 chip values. Accordingly, spreading codes allow individual signals to be differentiated, whereas scrambling codes allow signals from different base stations to be differentiated.

In practice, multiple delayed versions of the transmitted signal arrive at a CDMA receiver (e.g., a cellular handset). For example, one version of the signal may arrive by traveling a direct path from the base station to a cellular handset, while another version of the signal may arrive later because the signal reflected off of a building before arriving at the CDMA receiver. As such, the received signal is known as a multipath signal and contains multiple delayed versions of the transmitted signal, where each version of the transmitted signal is known as a path.

During decoding, the CDMA receiver processes the received multipath signal to identify the various paths contained therein. This function typically is performed by a system or logic block referred to as a "searcher". The searcher identifies individual paths of the multipath signal by correlating received samples against different offsets of a scrambling code, which is previously identified by the CDMA receiver from the received multipath signal. Notably, a correlator, or a processor that performs correlation, can demodulate a spread spectrum signal and/or measure the similarity of an incoming signal against a reference. The correlations are performed for a given dwell time such as 128, 256, or 512 chips over a corresponding portion of the scrambling code. By adjusting the offset of the portion of the scrambling code used for correlation, the searcher can perform correlations at different time delays to determine the particular delays at which valid paths exist.

The searcher generates a profile, which is a vector of the correlation output at different time delays. This profile is examined to determine the delays of the multipath signal at which various paths are located. This information can be passed to a rake receiver portion of the CDMA receiver. A rake receiver uses several baseband correlators, referred to as fingers, to individually process several paths of a multipath signal in accordance with the determined delays. In any case, the individual outputs of the rake receiver are combined to achieve improved communications reliability and performance.

A searcher typically is one of the largest blocks in a CDMA receiver, and is inefficient with respect to hardware design and power consumption. One reason for this is that a conventional searcher utilizes hardware-implemented linear feedback shift registers (LFSRs) to generate different offsets of the scrambling code. In particular, an LFSR generates a portion of the scrambling code dynamically, or "on the fly", with a new scrambling code chip value being generated for each chip in the dwell time. In addition, the CDMA receiver requires one finger to extract each path. Accordingly, one LFSR is needed for each individual finger since each finger operates at a different phase/delay of the scrambling code.

Conventional searcher architectures have other inefficiencies as well. For example, typically a series of multiplexers are used to access each of the output registers of the various descramblers in the searcher architecture. This configuration often leads to an inefficient implementation that reduces the overall speed at which the hardware operates. In addition, while conventional designs use multiple descramblers to allow the processing of multiple received signals simultaneously, such configurations do not provide for the generation of multiple values per chip.

It would be advantageous to provide a hardware-efficient design for a searcher for use in a CDMA receiver that overcomes the deficiencies described above.

SUMMARY OF THE INVENTION

In accordance with the principles of the invention, an apparatus comprises a receiver for receiving a multipath signal and a searcher that stores delayed samples of the received multipath signal, wherein the searcher is operative on the delayed samples of the received multipath signal for identifying one or more paths of the received multipath signal.

In an illustrative embodiment, the searcher comprises a shift register for storing sub-chip samples of a received multipath signal, a number of descramblers, a memory for storing a scrambling code and an integrator. Each of the descramblers operates on at least some of the stored sub-chip samples using the stored scrambling code to provide output values, wherein the integrator accumulates output values from each of the descramblers for use in identifying paths in the received multipath signal.

In another illustrative embodiment, a receiver performs a method for identifying paths of a received multipath signal, wherein the method comprises: storing delayed samples of the received multipath signal; and operating on the stored delayed samples of the received multipath signal for identifying paths of the received multipath signal.

BRIEF DESCRIPTION OF THE DRAWINGS

Preferred embodiments of the present invention will be described below in more detail, with reference to the accompanying drawings, in which.

DETAILED DESCRIPTION

Other than the inventive concept, the elements shown in the figures are well known and will not be described in detail. Also, familiarity with Universal Mobile Telecommunications System (UMTS)-based wireless communications systems is assumed and is not described in detail herein. For example, other than the inventive concept, spread spectrum transmission and reception, cells (base stations), user equipment (UE), downlink channels, uplink channels, the searcher, combiner and RAKE receivers are well known and not described herein. In addition, the inventive concept may be implemented using conventional programming techniques, which, as such, will not be described herein. Finally, like-numbers on the figures represent similar elements.

The present invention provides a method and system concerning a searcher for use with a receiver in a wireless system. Rather than use a number of LFSRs to vary the scrambling code offset used by each of a plurality of parallel descramblers to identify paths within a multipath signal, the present invention stores samples of the multipath signal from different points in time. For a given span of chips, these samples, representing different points in time, are processed using a scrambling code having a same offset. Providing a same scrambling code and offset to each parallel descrambler allows a single pre-generated scrambling code to be stored in memory. This eradicates the need for specialized hardware to generate separate dynamic scrambling codes for each descrambler.

Figure 1:
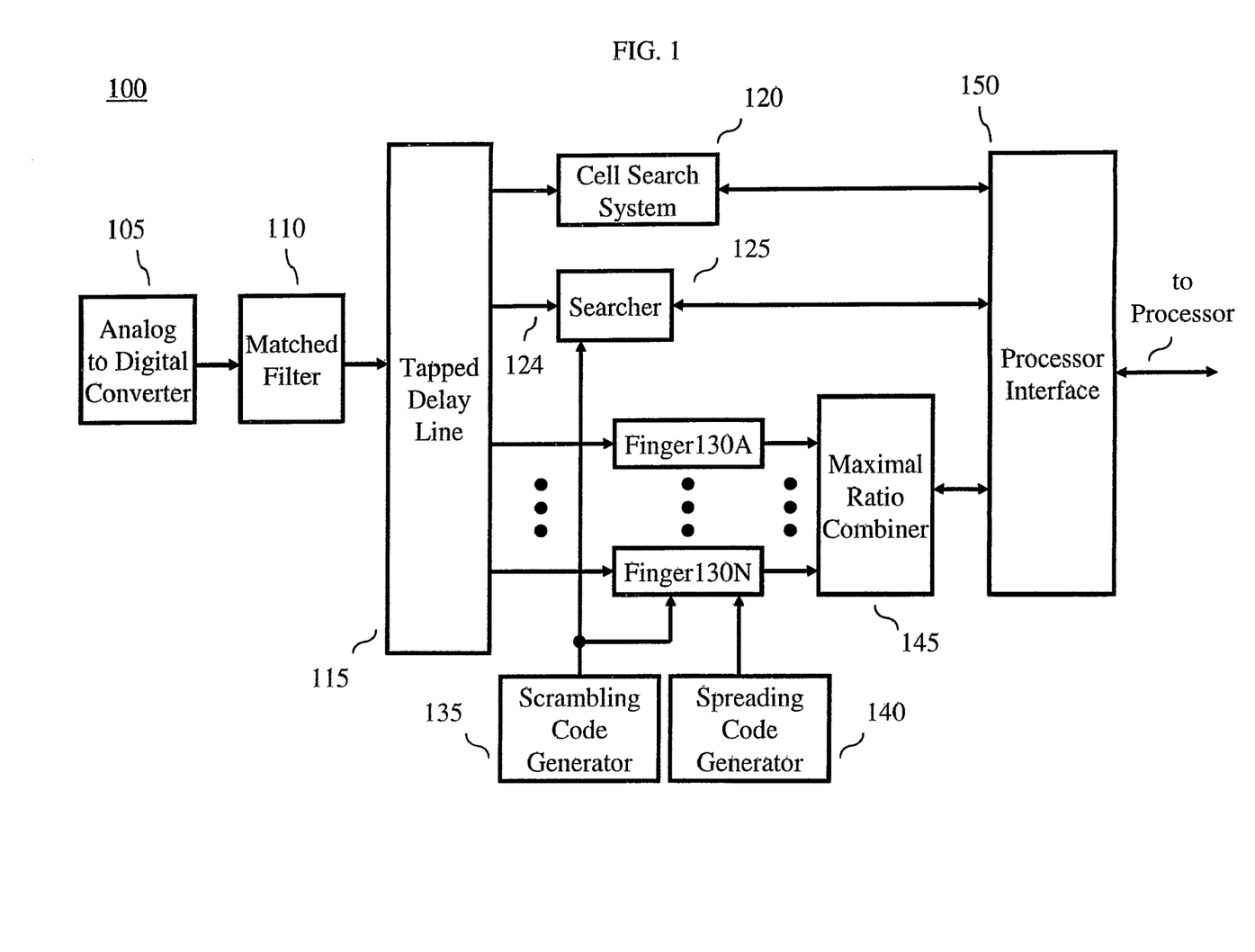
FIG. 1 is a schematic diagram illustrating one embodiment of a receiver in accordance with the inventive arrangements disclosed herein.

FIG. 1 is a schematic diagram illustrating one embodiment of an apparatus 100 in accordance with the inventive arrangements disclosed herein. As shown in FIG. 1, the apparatus 100 comprises a receiver section (or receiver) represented by an analog-to-digital converter 105 and matched filter 110. Analog-to-Digital converter 105 converts received analog signals into digital representations thereof. The resulting digital signals are provided to a matched filter 110.

Filtered signals are provided to a tapped delay line 115. The latter receives samples of a received multipath signal and provides different delayed versions thereof. Outputs of the tapped delay line 115, called taps, feed samples to the cell search system 120, the searcher 125, and each of the fingers 130A-130N. The tapped delay line 115 can be sub-chip in terms of resolution. Each tap provides samples for a different delayed version of a received multipath signal.

The signal provided to the cell search system 120 includes timing information. More particularly, the signal includes a composite Synchronization Channel (SCH) and a Common Pilot Channel (CPICH). The cell search system 120 determines timing information using the provided signal. More particularly, the cell search system 120 performs operations such as slot synchronization, frame synchronization, and scrambling code determination.

A scrambling code generator 135 provides scrambling codes needed by the searcher 125 and the fingers 130A-130N. In one embodiment, the scrambling code generator 135 can be a memory, in which the scrambling code determined by the cell search system 120 can be stored. The scrambling code is typically the length of a radio frame. In this example, the scrambling code covers a radio frame (38,400 chips) and comprises 38,400 chip values. (It should be noted that each scrambling code chip value includes an in-phase (I) and quadrature (Q) component.) Illustratively, the scrambling code memory is chip based and stores a complete period of a scrambling code (e.g., a UMTS frame spans 38,400 chips). Thus, in this example the amount of memory required to store the scrambling code value (determined by cell search system 120) is equal to: (38400×2) bits. This is further illustrated in FIG. 2, which shows an illustrative scrambling code generator 135. The latter comprises 38,400 memory locations 131, each memory location storing I and Q values of the scrambling code value. A simple index, or pointer, provides the required offset into the scrambling code value to provide that portion of the scrambling code needed by a respective finger. For example, index 133 points to a particular portion of the scrambling code chip value for use by, e.g., searcher 125. As such, if a different scrambling code chip value is required, the index value for that finger is simply changed—thus pointing to a different scrambling code chip value.

In accordance with the principles of the invention, the searcher 125, using a scrambling code obtained from the scrambling code generator 135, correlates the multipath signal to obtain profiles of, and identify, the locations of the various paths within the multipath signal (described further below).

As known in the art, and other than the inventive concept, each of the fingers 130A-130N can be assigned to a different path of the multipath signal as determined by the searcher 125. Fingers 130A-130N further process the various paths using a spreading code provided by a spreading code generator 140. A maximal ratio combiner 145 phase aligns the individual multi-path signals from each finger 130A-130N using the CPICH signal. The maximal ratio combiner 145 produces a constructively combined signal that is provided to a processor interface 150.

A processor (not shown) can be included to facilitate communications among the various components of the apparatus 100 through the processor interface 150. Thus, e.g., the various fingers 130A through 130N can be assigned to different paths of the received multipath signal as determined by searcher 125.

Figure 3:
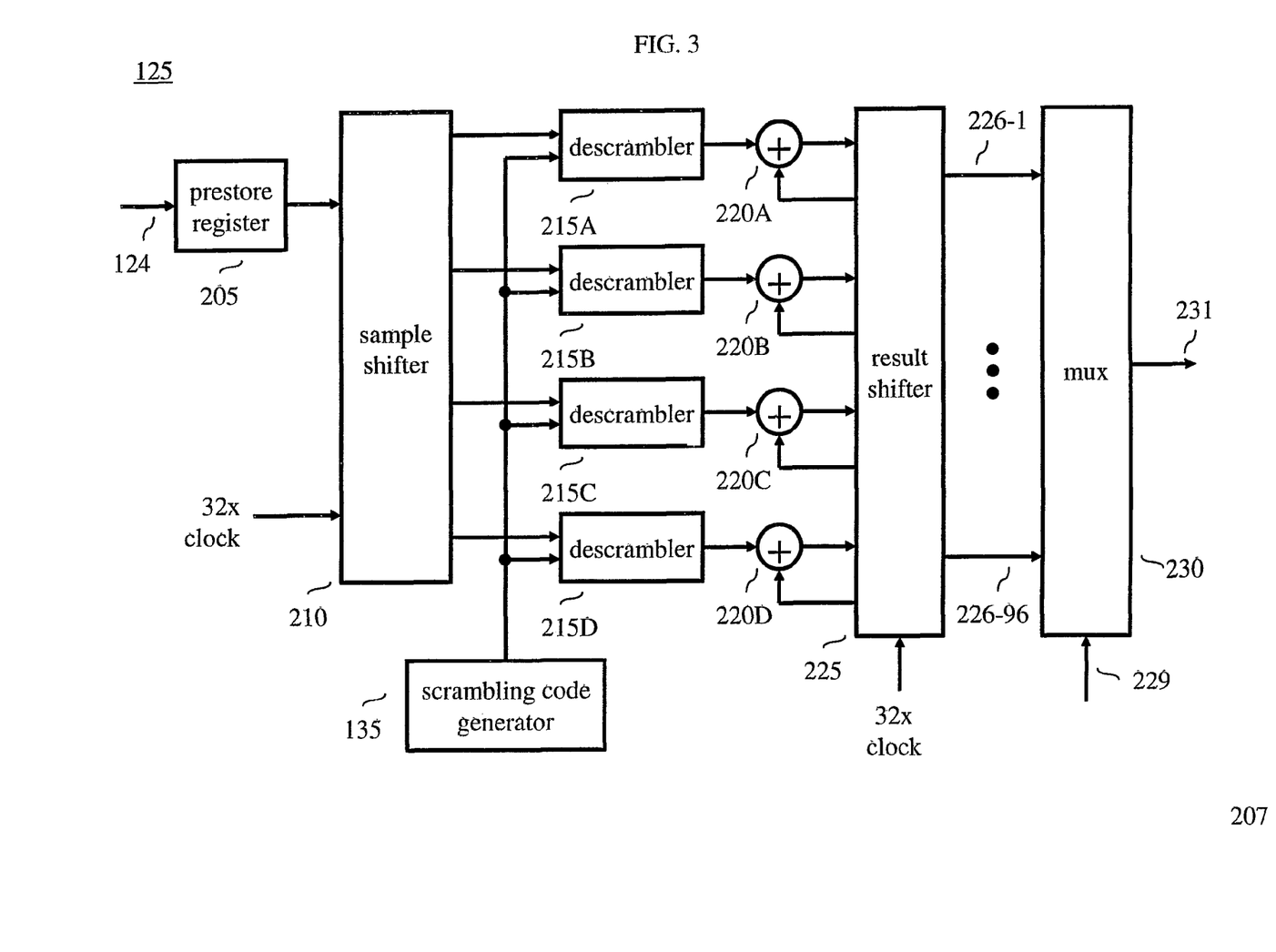
FIG. 3 is a schematic diagram illustrating one embodiment of a searcher, which can be used with the receiver of FIG. 1, in accordance with the inventive arrangements disclosed herein.

FIG. 3 is a schematic diagram illustrating one embodiment of a searcher 125, for use in the receiver of FIG. 1, in accordance with the inventive arrangements disclosed herein. In one embodiment, the searcher 125 can be implemented with a programmable dwell time that is independent of the hardware architecture. The multipath signals processed by the searcher 125 can have a sub-chip resolution, for example a resolution of ⅛ of a chip. That is, the multipath signals can have 8 samples per chip. In addition, the clock signal provided to the searcher 125 can be clocked at a rate that is faster than the chip rate, e.g., 32 times the chip rate.

The chip rate is the number of chips transmitted per second. For example, in the Universal Mobile Telecommunications System (UMTS) 3G Wideband CDMA (WCDMA) standard, the chip rate is 3.84 million chips per second. Since a chip is the fundamental unit of information in a CDMA system, the chip rate indicates how fast these units of information are transmitted in the system. In addition, the chip rate determines the processing rate at a receiver since the receiver must operate at a clock speed that is high enough to process the chips as they arrive. For example, and as noted above, the clock rate of the searcher is illustratively 32 times the chip rate. As such, and as described below, the searcher 125 processes 96 values in one chip.

The searcher 125 comprises a pre-store register 205, a sample shifter 210, a plurality of descramblers 215A-215D, a plurality of adders 220A-220D, a result shifter 225 and a selector, or multiplexer (mux), 230. The result shifter 225 provides processing results to mux 230, which provides results to other systems and/or processors as may be required within the receiver, via signal 231. Although shown in FIG. 3, scrambling code generator 135 may or may not be a part of searcher 125. The pre-store register 205 receives samples of a multipath signal (124) to be processed. Samples arrive at the searcher 125 several times per chip. The pre-store register 205 stores or buffers these samples until current correlation processing is complete. Once complete, the contents of the pre-store register 205 is transferred to the sample shifter 210, where those contents are used during subsequent correlation computations. Otherwise, storing received samples in the sample shifter 210 upon arrival to the searcher 125 would modify the contents of the sample shifter 210, thereby negatively affecting the processing of current correlations.

The pre-store register 205 receives samples from a fixed location on the tapped delay line 115 of FIG. 1. Each sample comprises multiple bits. For example, samples can have a resolution of 8 bits or 12 bits, etc. Samples arrive at the pre-store register 205 in serial fashion and are stored until a current correlation operation is finished. In one embodiment, the pre-store register 205 includes 8 registers (not shown) for storing 8 received samples, although the size of the pre-store register may vary as required. (It should also be noted that pre-store register 205 may also be a part of sample shifter 210. In this case, e.g., sample shifter 210 (described below) would comprise 104 registers.) Upon completion of the current correlation operation, the samples are loaded into the sample shifter 210.

The sample shifter 210 holds time delayed samples of the multipath signal. The sample shifter 210 has an illustrative capacity of 96 samples, rendering it capable of storing 12 chips of samples in the case where the resolution is 8, samples per chip. In other words, sample shifter 210 spans 12 chips. As samples are provided from the sample shifter 210 to the various descramblers 215A-215D, additional samples are loaded from the pre-store register 205 to the sample shifter 210. The sample shifter 210 can be loaded with 4 or more samples during each correlation operation (described below). In one embodiment, the sample shifter 210 can be loaded with 8 samples, corresponding to a resolution of one chip.

Figure 4:
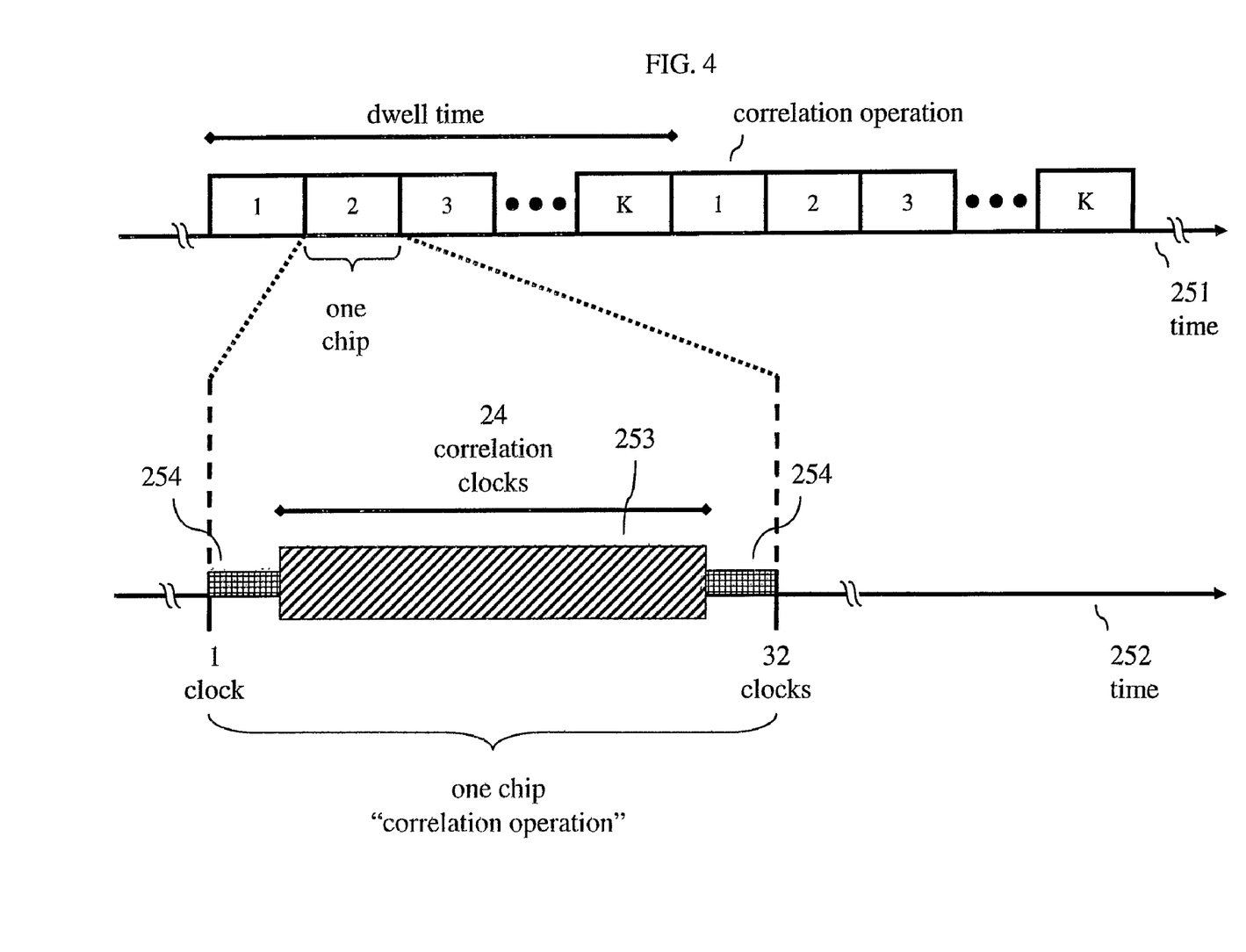
FIGS. 4 to 6 further illustrate the operation of searcher 125 of FIG. 3.
Figure 5:
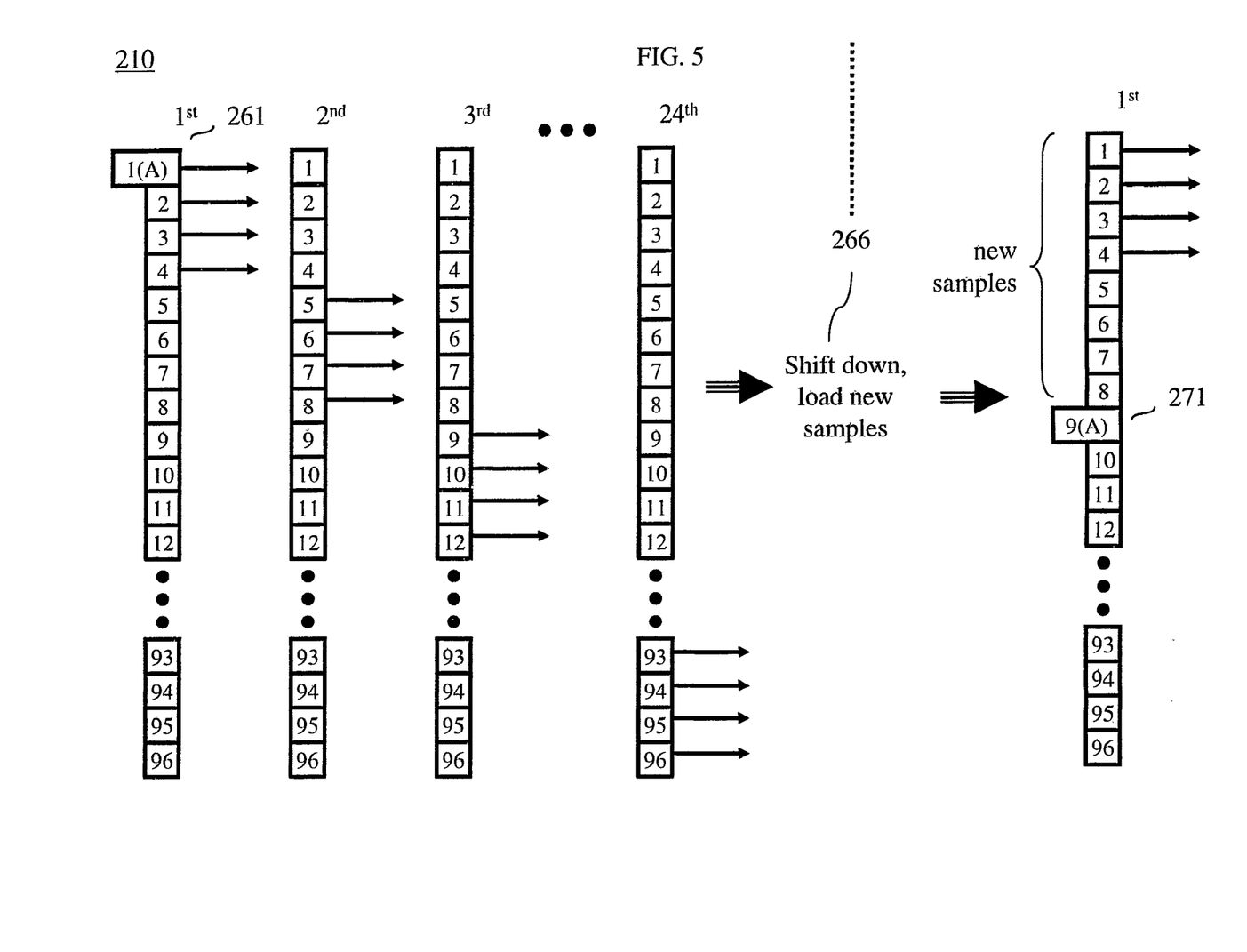

The sample shifter 210 is clocked with a 32× clock and sends four samples per clock cycle to the descramblers 215A-215D, with one sample being sent to each descrambler. This is further illustrated in FIGS. 4 and 5. Turning first to the top, portion of FIG. 4, this portion shows a time axis 251, which illustrates that searcher 125 performs a number of correlation operations, K, over a "dwell time", each correlation operation corresponding to, e.g., one chip interval. As noted above, values for the dwell time may be programmable. Since in this example, a correlation operation happens to occur during a chip interval, illustrative values for K are 128, 256, or 512 chips. A particular correlation operation during a chip interval is shown in the context of time axis 252 in the lower portion of FIG. 4. During each chip interval, searcher 125 performs a "correlation operation" on the 96 samples from sample shifter 210. Illustratively, searcher 125 is clocked at 32× the chip rate. As such there are thirty-two clocks during each chip interval. In this example, twenty-four of these clocks are illustratively used for performing correlations (portion 253) and the remaining eight of these clocks are illustratively used for "housekeeping" functions, e.g., load, shift operations, etc. (portions 254). Thus, at each of the correlation clocks, four samples at a time are provided to respective descramblers 215A, 215B, 215C and 215D. This results in searcher 125 performing 96 (24×4) correlations every chip of the dwell. It should be noted that any of the clock values described herein are merely illustrative and, as such, the inventive concept is not so limited. For example, less time may be used for "housekeeping" functions, the distribution between "housekeeping" functions and correlation clocks can vary (e.g., "housekeeping can occur at the end of a chip); "housekeeping" functions may be performed in parallel and/or the sample shifter can be clocked at rates other than 32 clocks per chip.

Figure 2:
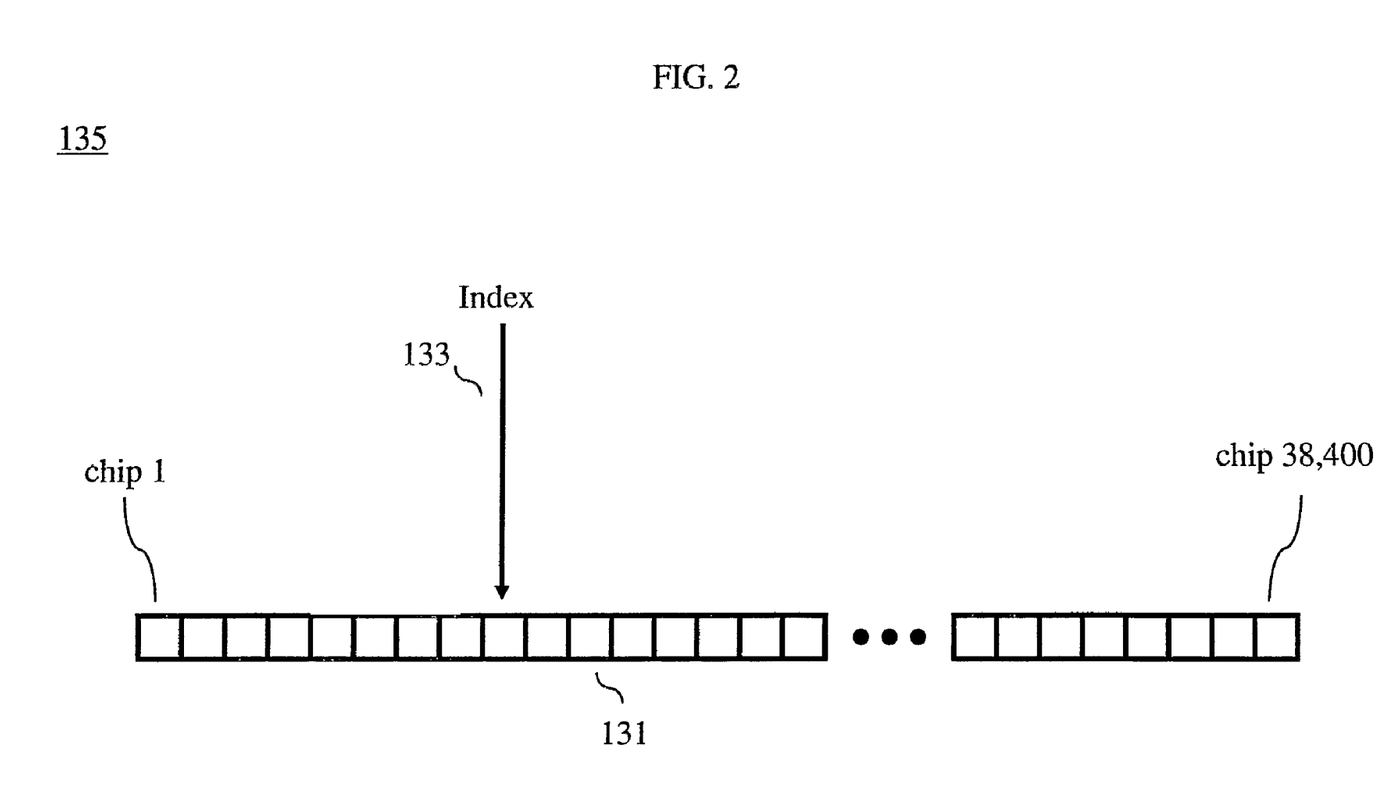
FIG. 2 further illustrates scrambling code generator 135 of FIG. 1 in accordance with the principles of the invention.

In each correlation operation, each descrambler 215 reads the current value of the scrambling code that is used for processing the samples stored in sample shifter 210. For example, in one embodiment, the same scrambling code and offset is used during a particular correlation operation. The offset of the scrambling code is updated for subsequent correlation operations until the dwell time is reached. In any case, the scrambling code value is read from the scrambling code generator 135 (described above). As shown in FIG. 2, rather than incorporating one linear feedback shift register to generate a unique scrambling code for each descrambler dynamically, each descrambler, 215A-215D reads the scrambling code from a single source, the memory of scrambling code generator 135.

Each descrambler 215 multiplies its input sample by the scrambling code value obtained from the scrambling code generator 135. This is further illustrated in FIG. 5 with regard to the samples from sample shifter 210. As noted above, there are twenty-four correlation clocks and sample shifter 210 stores 96 sample values. At the 1st correlation clock 261, sample shifter 210 provides values stored in registers 1, 2, 3 and 4 to the respective descramblers. For example, the value stored in register 1 is provided to descrambler 215A, the value stored in register 2 is provided to descrambler 215B, etc. For illustration purposes, the value stored in register 1 is denoted as "(A)". At the second correlation clock, the next four sample values—those stored in registers 5 through 8—are provided to the respective descramblers. At the third correlation clock, the next four sample values—those stored in registers 9 through 12—are provided to the respective descramblers, and so on. Finally, at the 24th correlation clock, the last four sample values—those stored in registers 93 through 96—are provide to the respective descramblers. As represented by dotted line 266, at the end of the 24th correlation clock, and during the above-mentioned "housekeeping" time intervals, the contents of the sample shifter are shifted down by eight samples (thus the values stored in registers 89 through 96 are replaced by the values previously stored in registers 81 through 88)—and a new set of eight samples are loaded into registers 1 through 8. This is further illustrated in FIG. 5, where the previously stored sample value "(A)" has been shifted down to register 9 (271) of sample shifter 210 and new values are loaded in registers 1 through 8 from pre-store register 205.

According to one embodiment of the present invention, each of the descramblers 215A-215D is implemented without a multiplier. Contrary to conventional searchers which store "+1" or "−1" values of the scrambling code, the present invention stores "0" or "1" scrambling code values within the memory of scrambling code generator 135. That is, a scrambling code value of "+1" can be stored as "1", while a scrambling code value of "−1" can be stored as "0" It should be appreciated, however, that "+1" can be made to correspond with "0" and "−1" with "1" as may be desired.

In any case, each descrambler 215A-215D performs a complex (i.e. real and imaginary) descramble using simplified logic that flips the sign of the input sample as needed. For example, in the case where a scrambling code value of "+1" is stored in the memory of scrambling code generator 135 as "1" and a value of "−1" is stored as "0", multiplication by "+1" can be performed by passing the sample to the output unchanged. Multiplication by "−1" can be performed by inverting the sign of the sample. This aspect of the searcher 125 and the scrambling code generator 135 allows the descramblers 215A-215D to be implemented without multipliers, which tend to be costly in terms of hardware area and power consumption.

Figure 6:
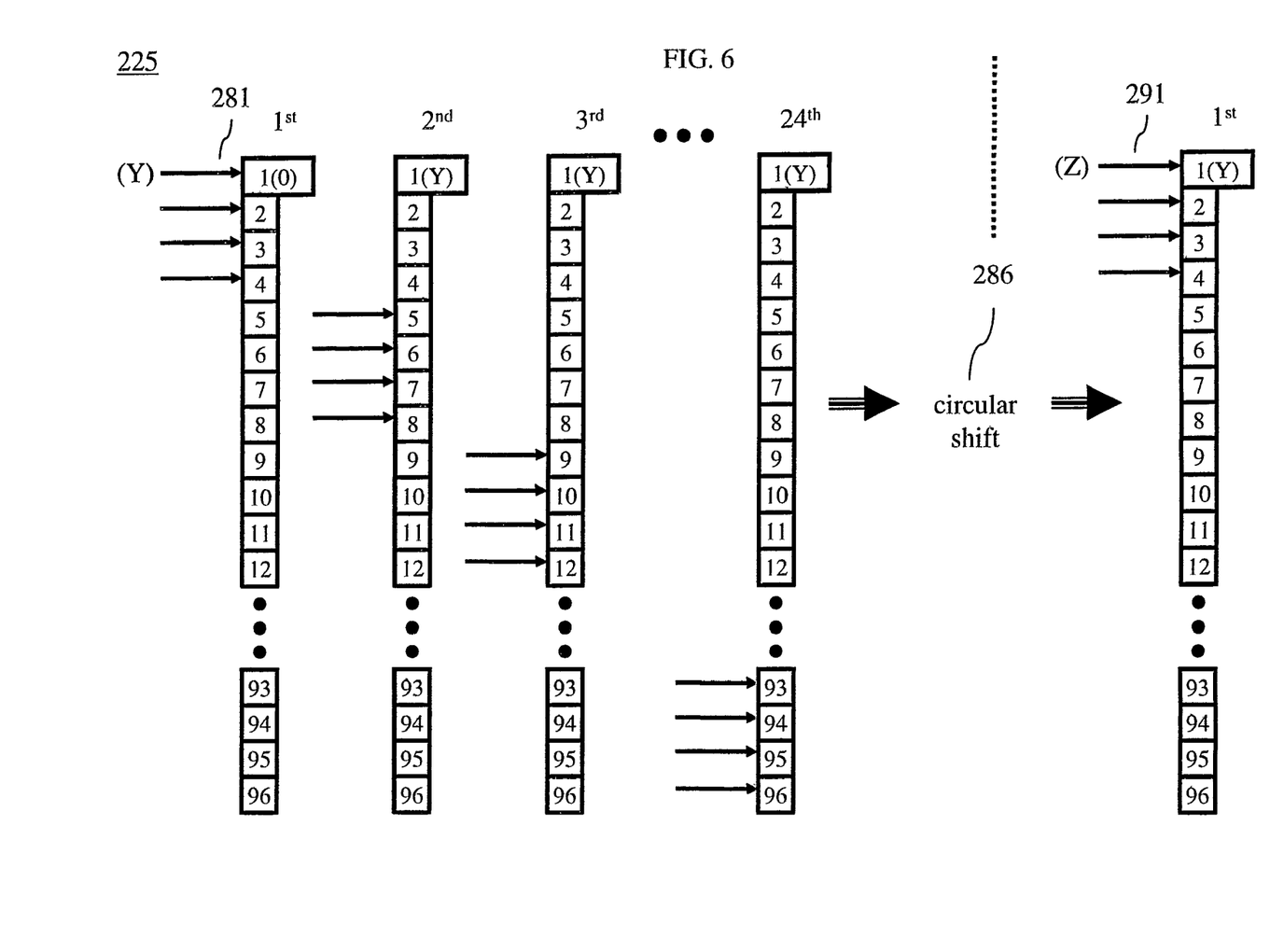

The output of each descrambler 215A-215D is summed, using the adders 220A-220D, with the last four samples in the result shifter 225. The result shifter 225 alleviates the need for individual multiplexers at the output of each descrambler 215A-215D. The values stored in the result shifter 225 are circularly shifted. This is further illustrated in FIG. 6. Like sample shifter 210, result shifter 225 comprises 96 registers for storing 96 correlation results. During a first correlation clock the first four register values of result shifter 225 are summed with the output values of each of the respective descramblers. This is represented in FIG. 6 by the first grouping of four arrows (281). For example, if descrambler 215A provides the correlation output value "(Y)" this is summed with the illustrative register value of zero ("(0)") in register one during the first correlation clock. The result of this summation operation ("(Y)") is then stored in register one (overwriting the previous value of "(0)") as shown at the $2^{nd}$ correlation clock.

In the second correlation clock, values from the next set of four registers of result shifter 225 are added to the output values of the respective descramblers and stored therein. For example, the output value from descrambler 215A is summed with the value in register 5, the output value from descrambler 215B is summed with the value in register 6, etc. This continues until the $24^{th}$ correlation clock, when values from the last four registers 93 through 96 are used. At the end of a correlation operation, a circular shift (286) occurs such that at the start of the next correlation those values from the first four registers of results shifter 225 are used again as represented by the grouping of four arrows (291). For example, if descrambler 215A provides the correlation output value "(Z)" in the next correlation operation, this is summed with the illustrative register value of ("(Y)"). The result (not shown in FIG. 6) of this summation operation ("(Y)+(Z)") is then stored in register one (overwriting the previous value of "(Y)"). Thus, each register of results shifter 225 accumulates or integrates values over a time period, e.g., a dwell.

If the dwell is not complete, the 8 samples stored in the pre-store register 205 are shifted into the sample shifter 210 for the next correlation operation and the process continues. If the dwell is complete, mux 230, which can be controlled via external hardware or software, reads the results from the result shifter 225 via address signal 229. In particular, signal 229 selects a particular one of the 96 register values of results shifter 226 (226-1 through 226-96) for application to other portions of apparatus 100 via signal 231.

Since searcher 125 operates at thirty two clocks per chip interval and utilizes twenty four of these clocks to perform correlations four samples at a time, 96 parallel correlation computations can be performed within the duration of a single chip. The scrambling code, read from the scrambling code generator 135, is kept constant during each step of the 96 correlations, or for the 12 chip span. That is, the scrambling code value provided to each descrambler 215A-215D has a same delay or phase during a span. Each of the 96 correlation computations is stored in the result shifter 225. As noted above, subsequent groups of outputs from the 96 correlation computations are added to corresponding ones of the prior 96 correlations. That is, the first correlation of a group of 96 correlations is summed with the first correlation of the next group, the second with the second, etc. A running total for each of the 96 correlations is stored in the result shifter. The searcher 125 continues performing groups of 96 correlations until the programmed dwell time is reached, at which point the results of the result shifter 225 are read out via mux 230.

While the searcher 125 has been described with reference to specific chip resolutions, operating frequencies, and number of components, the present invention is not so limited. For example, any of a variety of chip resolutions and operating frequencies can be used so long as suitable adjustments are made with respect to the searcher 125 architecture, as a whole, so that the searcher 125 operates substantially as described herein. Likewise, while specific values have been specified with respect to the number of adders, descramblers, and register capacities, such values can be scaled or changed according to the architecture implemented or desired.

Figure 7:
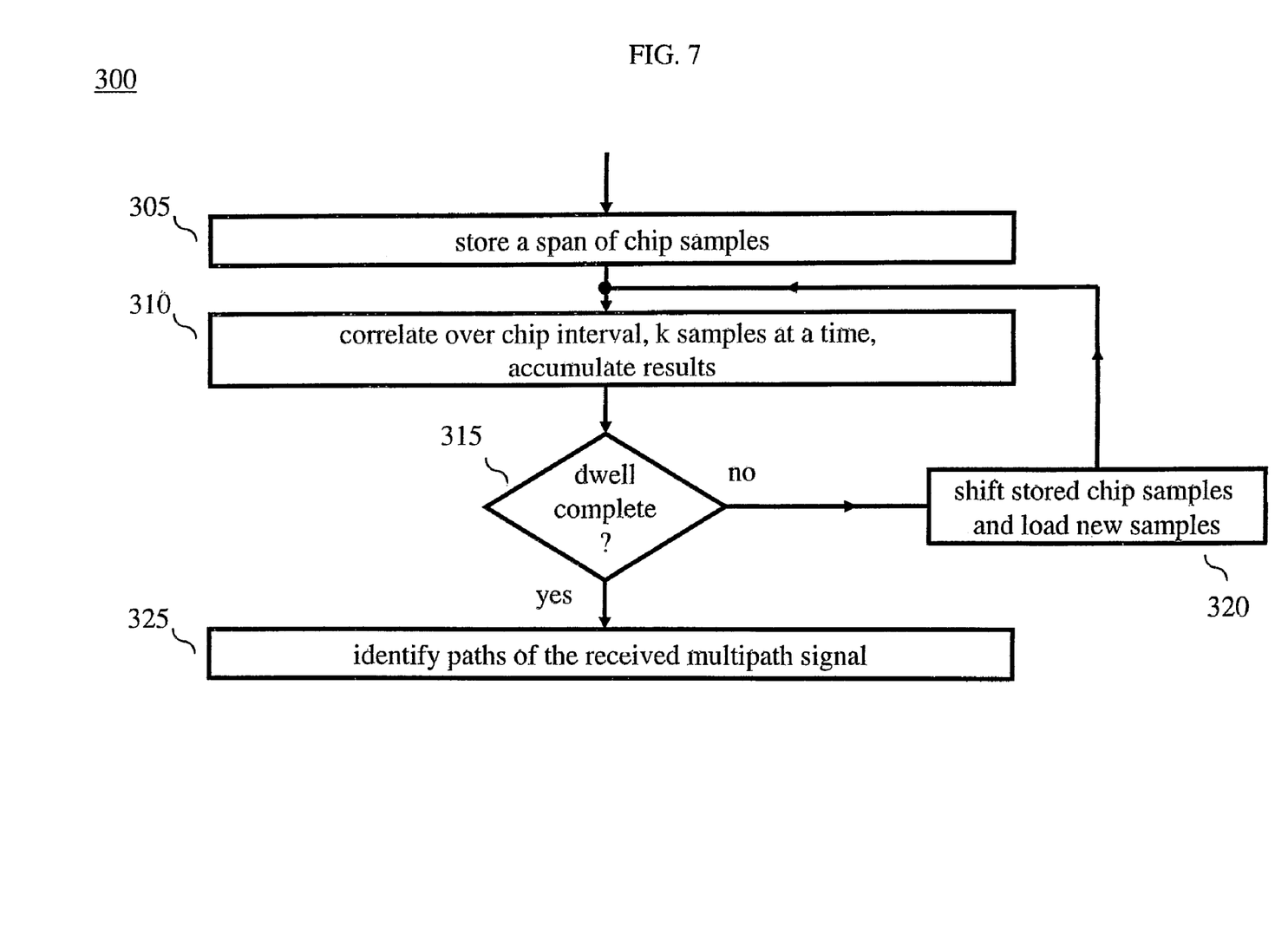
FIG. 7 is a flow chart illustrating a method of operation for a searcher in accordance with yet another embodiment of the present invention.

FIG. 7 is a flow chart illustrating a method 300 of operation for a searcher in accordance with yet another embodiment of the present invention. The method 300 can be performed, for example, using a searcher as described with reference to FIG. 3. In any case, the method 300 can begin in step 305, wherein a span of chip samples representing different points in time of a received multipath signal are stored. Illustratively, the span of chip samples covers twelve chips, with 8 samples per chip. In step 310, a correlation operation is performed for the span of stored chip samples over a period of time using k samples at a time. Illustratively, the period of time is a chip interval and four samples are correlated at a time. Results of each of the correlations are accumulated with previous correlation results.

In step 315, a determination is made as to whether the programmed or established dwell time has been completed. If not, the method continues with step 320 wherein the stored chip samples are shifted such that new samples are loaded therein. Correlation then continues in step 310. However, if the dwell time is complete, then, in step 325, the receiver analyzes the results as is known in the art for identifying various paths of the received multipath signal.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs) and/or in one or more stored program-controlled processors (e.g., a microprocessor or digital signal processor (DSP)). Similarly, although illustrated in the context of a UMTS-based system, the inventive concept is applicable to other communications system. It is therefore to be understood that numerous modifications may be made to the illustrative embodiments and that other arrangements may be devised without departing from the spirit and scope of the present invention as defined by the appended claims.

The invention claimed is:

1. An apparatus comprising:
   a receiver for receiving a multipath signal; and
   a searcher that stores delayed samples of the received multipath signal;
   wherein the searcher is operative on the delayed samples of the received multipath signal for identifying one or more paths of the received multipath signal;
   wherein the searcher comprises:
   a shift register for storing J sub-chip delayed samples of the received multipath signal;
   a number of descramblers for correlating at least some of the stored J sub-chip delayed samples of the received multipath signal with a portion of a scrambling code over a chip interval, such that (a) N of the J sub-chip delayed samples are correlated at a time with the portion of the scrambling code, where $J>N>1$, and (b) J output values are provided over the chip interval, wherein each descrambler uses the same portion of the scrambling code; and
   an integrator for accumulating each of the J output values from the number of descramblers over a dwell period, wherein the dwell period comprises more than one chip interval.

2. The apparatus of claim 1, wherein the apparatus is user equipment (UE) of a code division multiple access (CDMA)-based wireless network.

3. The apparatus of claim 1, wherein the portion of the scrambling code used by the number of descramblers changes every chip interval.

4. The apparatus of claim 1, further comprising a memory for storing the scrambling code and for providing the same portion of the scrambling code.

5. The apparatus of claim 4, wherein the scrambling code is stored in the memory with a scrambling code value of "+1" represented by a first binary value and a scrambling code value of "−1" represented by a second binary value.

6. The apparatus of claim 5, wherein each of the number of descramblers includes logic for selectively changing a sign of a sample in accordance with a corresponding scrambling code value.

7. A method for use in a receiver, the method comprising:
   receiving a multipath signal;
   storing J sub-chip delayed samples of the received multipath signal; and
   operating on the stored delayed samples of the received multipath signal for identifying one or more paths of the received signal;
   wherein the operating step includes the steps of:
   correlating at least some of the stored J sub-chip delayed samples of the received multipath signal with a portion of a scrambling code over a chip interval, such that (a) N of the J sub-chip delayed samples are correlated at a time with the portion of the scrambling code, where $J>N>1$, and (b) J output values are provided over the chip interval, wherein each correlation uses the same portion of the scrambling code; and
   accumulating each of the J output values resulting from performance of the correlating step over a dwell period, wherein the dwell period comprises more than one chip interval.

8. The method of claim 7, wherein the receiver is user equipment (UE) of a code division multiple access (CDMA)-based wireless network.

9. The method of claim 7, wherein the portion of the scrambling code changes every chip interval.

10. The method of claim 7, further comprising the step of storing the scrambling code in a memory for providing the same portion of the scrambling code.

11. The method of claim 10, wherein the scrambling code is stored in the memory with a scrambling code value of "+1" represented by a first binary value and a scrambling code value of "−1" represented by a second binary value.

12. The method of claim 11, wherein each correlation includes selectively changing a sign of a sample in accordance with a corresponding scrambling code value.

* * * * *